United States Patent
Wang et al.

(10) Patent No.: US 12,525,691 B2
(45) Date of Patent: Jan. 13, 2026

(54) BATTERY AND ELECTRONIC DEVICE

(71) Applicant: Honor Device Co., Ltd., Shenzhen (CN)

(72) Inventors: Yan Wang, Shenzhen (CN); Jiuliang Gao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 902 days.

(21) Appl. No.: 17/780,709

(22) PCT Filed: Jan. 18, 2022

(86) PCT No.: PCT/CN2022/072457
§ 371 (c)(1),
(2) Date: May 27, 2022

(87) PCT Pub. No.: WO2022/252646
PCT Pub. Date: Dec. 8, 2022

(65) Prior Publication Data
US 2024/0162586 A1 May 16, 2024

(30) Foreign Application Priority Data
Jun. 1, 2021 (CN) .......................... 202110609465.7

(51) Int. Cl.
*H01M 50/583* (2021.01)
*H01M 50/109* (2021.01)
*H01M 50/121* (2021.01)

(52) U.S. Cl.
CPC ....... *H01M 50/583* (2021.01); *H01M 50/109* (2021.01); *H01M 50/121* (2021.01); *H01M 2200/106* (2013.01); *H01M 2220/30* (2013.01)

(58) Field of Classification Search
CPC ......... H01M 50/583; H01M 2200/106; H01M 2220/30; H01M 10/425; H01M 50/55; H01M 10/4257; H01M 2010/4271; Y02E 60/10; H05K 1/181
See application file for complete search history.

(56) References Cited

FOREIGN PATENT DOCUMENTS

| CN | 102637833 | A |   | 8/2012 |
| CN | 203368940 | U |   | 12/2013 |
| CN | 203950852 | U | * | 11/2014 |
| CN | 207490033 | U |   | 6/2018 |
| CN | 110299479 | A |   | 10/2019 |
| CN | 110379945 | A |   | 10/2019 |

(Continued)

*Primary Examiner* — Basia A Ridley
*Assistant Examiner* — Heng M. Chan
(74) *Attorney, Agent, or Firm* — Leydig, Voit & Mayer, Ltd.

(57) ABSTRACT

A battery and an electronic device are provided. The battery has at least one notch at an end of a protection board away from a battery cell. The notch has a first side wall and a second side wall opposite the first side wall. A first preset distance is present between the first side wall and an outer edge of one side of the protection board, and a second preset distance is present between the second side wall and an outer edge of the other side of the protection board. The first preset distance and the second preset distance are both greater than 0. Such design saves a design area of the battery, providing more space for arrangement of other components in an electronic device.

16 Claims, 9 Drawing Sheets

(56) References Cited

FOREIGN PATENT DOCUMENTS

| CN | 111343309 | A | | 6/2020 | |
|---|---|---|---|---|---|
| CN | 213692206 | U | | 7/2021 | |
| CN | 113725502 | A | | 11/2021 | |
| CN | 110299479 | B | * | 1/2022 | ............ H01M 50/10 |
| JP | 2009104843 | A | | 5/2009 | |

* cited by examiner

BATTERY AND ELECTRONIC DEVICE

CROSS-REFERENCE TO RELATED APPLICATIONS

This application is a National Stage of International Application No. PCT/CN2022/072457, filed on Jan. 18, 2022, which claims priority to Chinese Patent Application No. 202110609465.7, filed on Jun. 1, 2021, both of which are hereby incorporated by reference in their entireties.

TECHNICAL FIELD

Embodiments of this application relate to the field of battery technologies, and in particular, to a battery and an electronic device.

BACKGROUND

A battery is an apparatus that converts chemical energy into electric energy with a cup, a groove, or other containers, or partial space of a composite container to contain an electrolyte and metal electrodes that produce currents. With the advancement of science and technology, a battery is generally a small apparatus that produces electric energy, for example, a solar battery. Performance parameters of batteries include electromotive force, capacity, specific energy, and resistance. With batteries used as a source of power, currents with stable voltage and stable intensity that provide stable power for a long time can be obtained which are little impacted by the outside. Furthermore, batteries are simple in structure, easy to carry, easy to charge and discharge, and stable and reliable in performance without being affected by external weather and temperature, playing a great role in all aspects of modern social life.

In the prior art, batteries are rectangular in overall profile. A battery typically includes a battery cell and a protection board, with the battery cell as wide as the protection board. After its protection board is packaged in an aluminum-plastic film, the battery exhibits a rectangular shape with straight edges in its periphery. However, in current design schemes, the protection board occupies an excessive design area of the battery and increases an overall volume of the battery, which is not conducive to arrangement of other components in an electronic device.

SUMMARY

This application provides a battery and an electronic device, to save a design area of a battery, providing more space for arrangement of other components in an electronic device.

According to a first aspect, an embodiment of this application provides a battery, including a battery cell and a protection board connected to the battery cell; where at least one notch is provided at an end of the protection board away from the battery cell; the notch has a first side wall and a second side wall opposite the first side wall, a first preset distance is present between the first side wall and an outer edge of one side of the protection board, and a second preset distance is present between the second side wall and an outer edge of the other side of the protection board; and the first preset distance and the second preset distance are both greater than 0.

The battery according to the embodiment of this application has at least one notch at an end of the protection board away from the battery cell, where the notch has a first side wall and a second side wall opposite the first side wall, with a first preset distance present between the first side wall and an outer edge of one side of the protection board and a second preset distance present between the second side wall and an outer edge of the other side of the protection board, where the first preset distance and the second preset distance are both greater than 0. Such design can free up internal space of the protection board and saves a design area of the battery while satisfying same battery specifications without compromising battery capacity, providing more space for arrangement of other components in an electronic device to help the arrangement and use of other components in the electronic device.

In a possible implementation, there is one notch, and a size of the notch in a first direction is less than or equal to one-third of a size of the protection board in the first direction; or there is a plurality of notches, and a sum of sizes of the plurality of notches in the first direction is less than or equal to one-third of a size of the protection board in the first direction; where the first direction is a width direction of the battery. In this way, arrangement of components on the protection board, layout of wirings on the protection board, and mechanical strength of the protection board can be guaranteed.

In a possible implementation, the size of the notch in the first direction is 15 mm to 25 mm; or the sum of the sizes of the plurality of notches in the first direction is 15 mm to 25 mm.

In a possible implementation, the size of the protection board in the first direction is less than a size of the battery cell in the first direction. In this way, after the protection board and the battery cell are assembled, one or two missing corners are formed between an end of the battery cell close to the protection board and outer edges of left and right sides of the protection board, such that a space of one or two missing corners can be further freed up, which helps internal spatial layout of the electronic device.

In a possible implementation, the notch further has a bottom wall, and a distance between the bottom wall and the battery cell is one-third to five-sixths of a size of the protection board in a second direction; where the second direction is perpendicular to the first direction. In this way, both wiring at a position corresponding to the protection board under the notch and layout space for other components on the protection board can be guaranteed.

In a possible implementation, the battery further includes at least one connecting terminal, where one end of the connecting terminal is electrically connected to the battery cell, and the other end of the connecting terminal is electrically connected to the protection board. In this way, it can be ensured that the battery cell is electrically connected to the protection board via the connecting terminal.

In a possible implementation, in a case that a projection zone of the connecting terminal in the second direction and a projection zone of the notch in the second direction have an overlapping zone, the distance between the bottom wall and the battery cell is greater than or equal to a size of the connecting terminal in the second direction. In this way, it can be ensured that a depth of the notch in the second direction does not affect the connection between the connecting terminal and the protection board. The wiring at a position corresponding to the protection board under the notch, the layout space for other components on the protection board, and performance of the electrical connection between the connecting terminal and the protection board can be guaranteed.

In a possible implementation, the distance between the bottom wall and the battery cell is two-thirds to five-sixths of the size of the protection board in the second direction. In this way, the wiring at a position corresponding to the protection board under the notch, the layout space for other components on the protection board, and performance of the electrical connection between the connecting terminal and the protection board can be guaranteed.

In a possible implementation, the battery further includes a packaging component, where the packaging component is at least partially connected to the protection board, and the packaging component is configured to protect the protection board.

In a possible implementation, the packaging component includes a first part, a second part, and a third part that is connected to the first part and the second part; a first end of the first part is flush with a first end of the second part and a first end of the third part, and a second end of the third part is lower than a second end of the first part and a second end of the second part; and a first slit is present between the first part and the third part, and a second slit is present between the second part and the third part.

In this way, it can be ensured that the first part, the second part, and the third part of the packaging component form a concave that matches the notch of the protection board. In addition, the presence of slits between the first part and the third part and between the second part and the third part helps the packaging component to fit with the notch of the protection board.

In a possible implementation, the third part is located in a position on the protection board corresponding to the notch, and the first part and the second part are respectively located on two sides of the third part; and the first slit overlaps the first side wall of the notch, and the second slit overlaps the second side wall of the notch.

In a possible implementation, the second end of the first part and the second end of the second part are attached to an end of the battery cell close to the protection board. In this way, connection strength between the protection board and the battery cell can be further guaranteed.

In a possible implementation, the second end of the first part has a protruding portion; or the second end of the second part has a protruding portion; or the second end of the first part and the second end of the second part both have a protruding portion.

In a possible implementation, the protruding portion is attached to an end of the battery cell close to the protection board. The protruding portion saves a bonding area for the first part and the second part on the battery cell, reducing a size of the packaging component to be used and lowering costs.

In a possible implementation, the packaging component is made of MYLAR; or the packaging component is an aluminum-plastic film. MYLAR is dimensionally stable and straight with excellent tensile strength. It is resistant to heat, cold, moist, water, and chemical corrosion, and has excellent insulation performance as well as excellent electrical performance, mechanical performance, heat resistance and chemical resistance. Aluminum-plastic film has extremely high barrier and good cold stamping formability with resistance to puncture and electrolyte, and provides good electrical and insulation performance and excellent moisture resistance.

In a possible implementation, the protection board is provided with any one or more of a positive temperature coefficient thermistor, a circuit breaker, and a metal-oxide semiconductor field-effect transistor. In this way, over-current protection, over-voltage protection, overcharge protection, over-discharge protection and the like for the battery can be further implemented. Once a failure occurs, the protection board initiates a protection action by breaking its physical connection with the battery cell so as to protect the battery.

According to a second aspect, an embodiment of this application provides an electronic device, including at least a display screen, a rear cover, and a circuit board located between the display screen and the rear cover; and further including any battery described above, where a battery interface of the battery is electrically connected to the circuit board.

The electronic device according to the embodiment of this application includes the foregoing battery, where the battery has at least one notch at an end of the protection board away from the battery cell. The notch has a first side wall and a second side wall opposite the first side wall, with a first preset distance present between the first side wall and an outer edge of one side of the protection board and a second preset distance present between the second side wall and an outer edge of the other side of the protection board, where the first preset distance and the second preset distance are both greater than 0. Such design can free up internal space of the protection board and saves a design area of the battery, providing more space for arrangement of other components in the electronic device. In addition, user experience of the electronic device can be optimized, with stable signal transmission and proper functioning of the electronic device guaranteed.

In a possible implementation, the battery includes a battery cell and a protection board connected to the battery cell; and at least one notch is provided at an end of the protection board away from the battery cell, and the circuit board is partially located inside the notch. Because the circuit board is partially located in the notch of the protection board, space in the notch is properly utilized, so that spatial utilization inside the electronic device is increased.

Reference signs are described as follows:

100. battery; 10. battery cell; 20. protection board;
210. first outer edge; 220. second outer edge; 201. notch;
2011. first side wall; 2012. second side wall; 2013. bottom wall;
30. connecting terminal; 40. packaging component; 401. first part;
4011. first end of first part; 4012. second end of first part; 402 second part;
4021. first end of second part; 4022. second end of second part; 403. third part;
4031 first end of third part; 4032. second end of third part; 404. first slit;
405. second slit; 406. protruding portion; 50. missing corner;
L1. first direction; L2. second direction; S1. first preset distance;
S2. second preset distance; 200. mobile phone; 21. display screen;
211. opening; 22. middle frame; 221. metal middle plate;
222. frame; 23. circuit board; 231. shielding case;
24. rear cover; 25. front-facing camera module; 26. rear-facing camera module.

DETAILED DESCRIPTION OF EMBODIMENTS

Terms in the embodiments of this application are merely intended to describe specific embodiments of this application, and are not intended to limit this application. The following describes the embodiments of this application in detail with reference to the accompanying drawings.

An electronic device provided in the embodiments of this application may include but is not limited to mobile phones, tablet computers, laptop computers, ultra-mobile personal computers (UMPCs), handheld computers, netbooks, point of sales (POSs) terminals, personal digital assistants (PDAs), wearable devices, virtual reality devices, wireless USB flash drives, Bluetooth speakers/earphones, or battery-equipped mobile or fixed terminals such as on-board factory installed products, event data recorders, and security devices.

Figure 1:
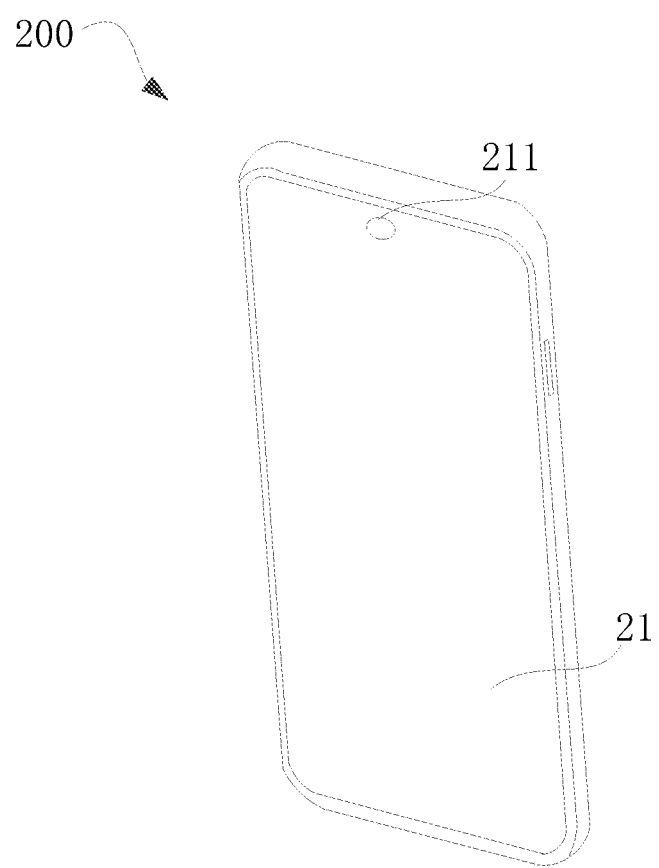
FIG. 1 is a schematic diagram of an overall structure of an electronic device according to an embodiment of this application.
Figure 2:
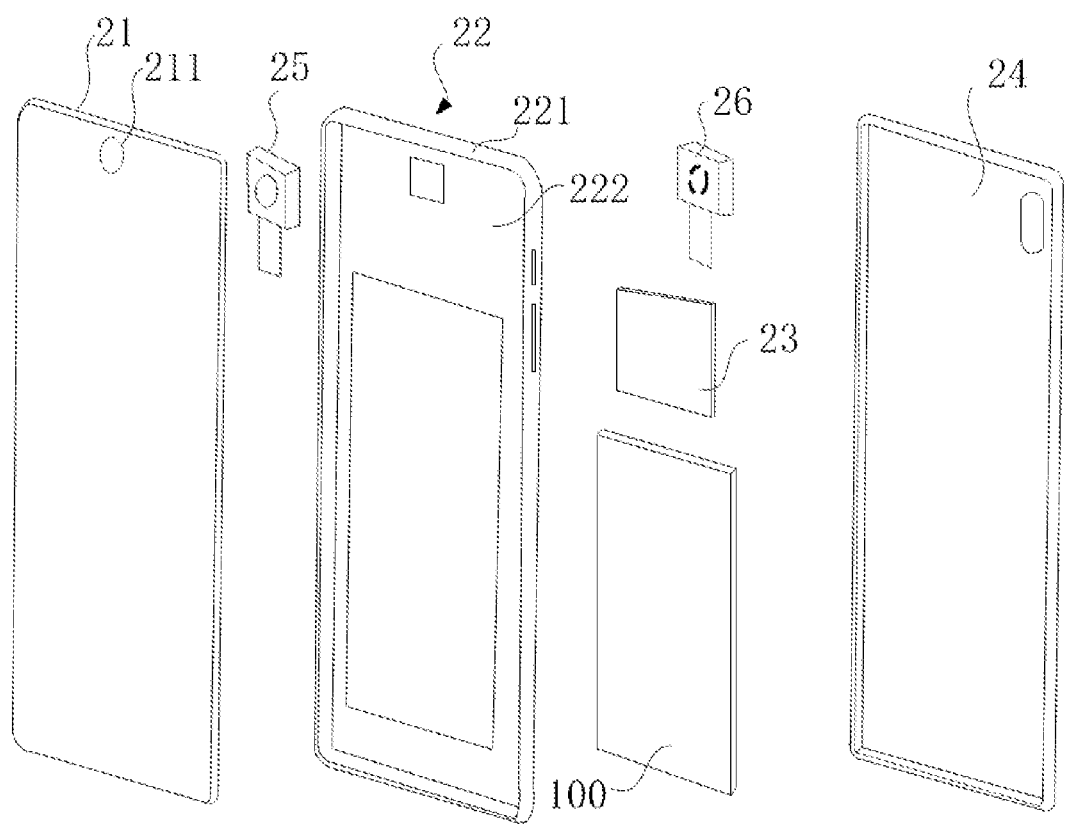
FIG. 2 is a schematic diagram of an exploded structure of an electronic device according to an embodiment of this application.

A mobile phone 200 provided in the embodiments of this application may be a curved screen mobile phone or a flat screen mobile phone. The embodiments of this application are described with a flat screen mobile phone as an example. FIG. 1 and FIG. 2 respectively show an overall structure and an exploded structure of the mobile phone 200. A display screen 21 of the mobile phone 200 provided in the embodiments of this application may be a waterdrop notch screen, a notch screen, a full screen, or a punch-hole screen (see FIG. 1). The following uses a punch-hole screen as an example for description.

In the embodiments of this application, the electronic device being the mobile phone 200 is used as an example for description. The mobile phone 200 may at least include: the display screen 21, a rear cover 24, a circuit board 23 located between the display screen 21 and the rear cover 24, and a battery 100. The battery 100 typically has a battery interface (not shown in the figure) that is electrically connected to the circuit board 23.

In some examples, referring to FIG. 2, the mobile phone 200 may include a middle frame 22 and the circuit board 23 may be disposed on the middle frame 22. For example, the circuit board 23 may be disposed on a side of the middle frame 22 facing the rear cover 24 (as shown in FIG. 2), or the circuit board 23 may be disposed on a side of the middle frame 22 facing the display screen 21. The display screen 21 and the rear cover 24 are respectively located on two sides of the middle frame 22. The battery 100 may be disposed on the side of the middle frame 22 facing the rear cover 24 (as shown in FIG. 2), or the battery 100 may be disposed on the side of the middle frame 22 facing the display screen 21. For example, the side of the middle frame 22 facing the rear cover 24 may have a battery compartment (not shown in the figure), and the battery 100 is installed in the battery compartment.

The battery 100 may be connected to a charging management module and the circuit board 23 via a power management module. The power management module receives input from the battery 100 and/or the charging management module, and powers a processor, an internal memory, an external memory, the display screen 21, a camera module, a communications module, and the like. The power management module may also be configured to monitor parameters such as capacity of the battery 100, a cycle count of the battery 100, and a state of health (leakage and impedance) of the battery 100. In some other embodiments, the power management module may alternatively be disposed in a processor of the circuit board 23. In some other embodiments, the power management module and the charging management module may alternatively be disposed in a same component.

In a case that the mobile phone 200 is a flat screen mobile phone, the display screen 21 may be an organic light-emitting diode (OLED) display screen or a liquid crystal display (LCD). In a case that the mobile phone 200 is a curved screen mobile phone, the display screen 21 may be an OLED display screen.

Still referring to FIG. 2, the middle frame 22 may include a metal middle plate 221 and a frame 222, where the frame 222 is arranged around a periphery of the metal middle plate 221. Generally, the frame 222 may include a top frame, a bottom frame, a left side frame and a right side frame, where the top frame, the bottom frame, the left side frame and the right side frame are connected to form the frame 222 that has a rectangular ring structure. The metal middle plate 221 may be made of a material including but not limited to an aluminum plate, an aluminum alloy, stainless steel, a steel-aluminum composite die casting plate, a titanium alloy, a magnesium alloy, or the like. The frame 222 may be a metal frame, a ceramic frame, or a glass frame. In a case that the frame 222 is a metal frame, the metal frame may be made of a material including but not limited to an aluminum alloy, stainless steel, a steel-aluminum composite die casting plate, a titanium alloy, or the like. The metal middle plate 221 may be connected to the frame 222 through clamping, welding, bonding, or integral molding, or the metal middle plate 221 may be fixedly connected to the frame 222 through injection molding.

The rear cover 24 may be a metal rear cover 24, a glass rear cover 24, a plastic rear cover, or a ceramic rear cover. In the embodiment of this application, the rear cover 24 is not limited in terms of material and not limited to the foregoing examples.

It should be noted that, in some examples, the rear cover 24 of the mobile phone 200 may be connected to the frame 222 to form an unibody rear cover. For example, the mobile phone 200 may include the display screen 21, the metal middle plate 221 and a battery cover, where the battery cover may be a cover that is an unibody construction of the frame 222 and the rear cover 24, such that the circuit board 23 and the battery 100 are located in a space enclosed by the metal middle plate 221 and the battery cover.

Because components are disposed on a top part and a bottom part of the mobile phone 200, in an embodiment of this application, the circuit board 23 may include a first circuit board and a second circuit board, where the first circuit board and the second circuit board are electrically connected via a flexible circuit board or lead wires. For example, the first circuit board may be located on an upper part of the middle frame 22 and the second circuit board may be located on a lower part of the frame 22, so that interfaces disposed on the top part and the bottom part of the mobile phone 200 can be electrically connected to the circuit board 23. Certainly, in other examples, the circuit board may include but is not limited to the first circuit board and the second circuit board. For example, the circuit board may include only the first circuit board or only the second circuit board.

To implement a shooting function, the mobile phone 200 may further include a camera module. Continue referring to FIG. 2. The camera module may include a front-facing camera module 25 and a rear-facing camera module 26. The rear-facing camera module 26 may be disposed on a side of the metal middle plate 221 facing the rear cover 24, the display screen 21 is provided with an opening 211, and a lens of the rear-facing camera module 26 corresponds to the opening 211. The rear cover 24 may be provided with an installation hole (not shown in the figure) for installation of part of the rear-facing camera module 26. Certainly, the rear-facing camera module 26 may alternatively be installed on a side of the rear cover 24 facing the metal middle plate 221. The front-facing camera module 25 may be disposed on a side of the metal middle plate 221 facing the display screen 21, or the front-facing camera module 25 may be disposed on a side of the metal middle plate 221 facing the rear cover 24, or the front-facing camera module 25 may be disposed on a side of the rear cover 24 facing the display screen 21. The metal middle plate 221 may be provided with an opening for exposure of a lens end of the front-facing camera module 25.

In an embodiment of this application, the front-facing camera module 25 and the rear-facing camera module 26 may be arranged in positions including but not limited to those in the foregoing descriptions. In some embodiments, 1 to N front-facing camera module 25 and 1 to N rear-facing camera module 26 may be provided in the mobile phone 200, where N is a positive integer greater than 1.

It should be understood that the structure illustrated in the embodiments of this application does not constitute any specific limitation on the mobile phone 200. In some other embodiments of this application, the mobile phone 200 may include more or fewer components than shown in the figure, or combine some components, or split some components, or have different component arrangements. The components shown in the figures may be implemented by hardware, software, or a combination of software and hardware.

The battery 100 is an energy storage tool that supplies power for the electronic device. For example, the battery 100 of the mobile phone 200 is typically a lithium battery or a nickel-hydrogen battery. In actual use, existing batteries are rectangular in overall profile. After the protection board region is packaged in an aluminum-plastic film, the protection board has straight edges. The battery in such profile allows more free space inside the protection board.

On this basis, an embodiment of this application provides a battery, where the battery has at least one notch at an end of a protection board away from a battery cell, where the notch has a first side wall and a second side wall opposite the first side wall, with a first preset distance present between the first side wall and an outer edge of one side of the protection board and a second preset distance present between the second side wall and an outer edge of the other side of the protection board, where the first preset distance and the second preset distance are both greater than 0. Such design can free up internal space of the protection board and saves a design area of the battery while satisfying same battery specifications without compromising battery capacity, providing more space for arrangement of other components in an electronic device to help the arrangement and use of other components in the electronic device.

The following uses specific embodiments as examples for a detailed description of specific structures of the battery with reference to the accompanying drawings.

Figure 3:
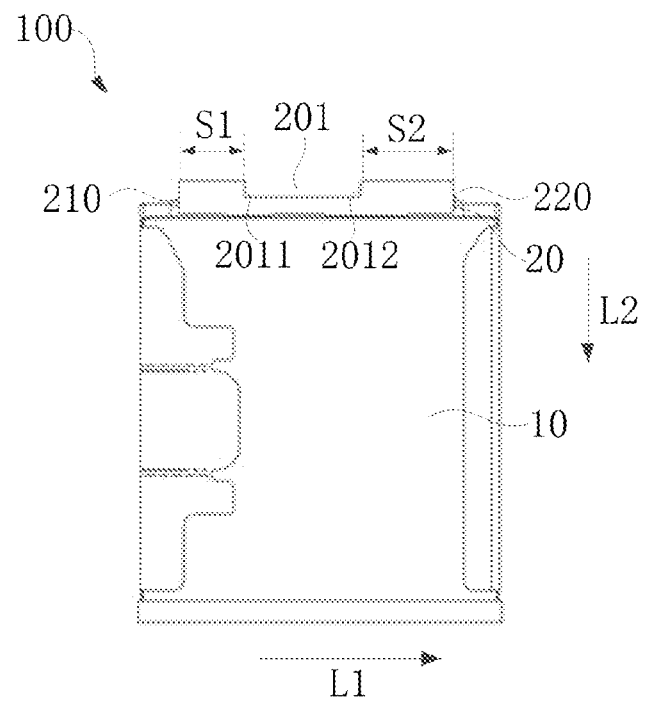
FIG. 3 is a schematic diagram of a frontal structure of a battery according to an embodiment of this application.
Figure 4:
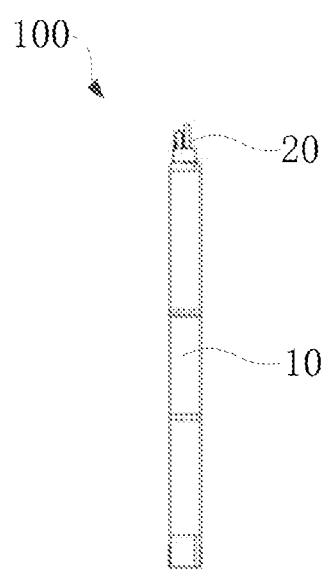
FIG. 4 is a schematic diagram of a lateral structure of a battery according to an embodiment of this application.

As shown in FIG. 3 and FIG. 4, an embodiment of this application provides a battery 100, where the battery 100 may include a battery cell 10 and a protection board 20 connected to the battery cell 10, and at least one notch 201 is provided at an end of the protection board 20 away from the battery cell 10.

As shown in FIG. 3, the notch 201 has a first side wall 2011 and a second side wall 2012 opposite the first side wall 2011, with a first preset distance S1 present between the first side wall 2011 and an outer edge (for example, a first outer edge 210 in FIG. 3) of one side of the protection board 20 and a second preset distance S2 present between the second side wall 2012 and an outer edge (for example, a second outer edge 220 in FIG. 3) of the other side of the protection board 20, where the first preset distance S1 and the second preset distance S2 are both greater than 0.

In this way, the battery 100 takes a profile with a recess (that is the notch 201) in the middle of the protection board 20, and a space inside the recess may be used for placing other structures of the mobile phone 200 or place other components. Therefore, the embodiment of this application saves a design area of the battery 100 while satisfying same battery specifications without compromising battery capacity, providing more space for arrangement of other components in the mobile phone 200, and thereby increasing spatial utilization in the mobile phone 200.

Figure 6:
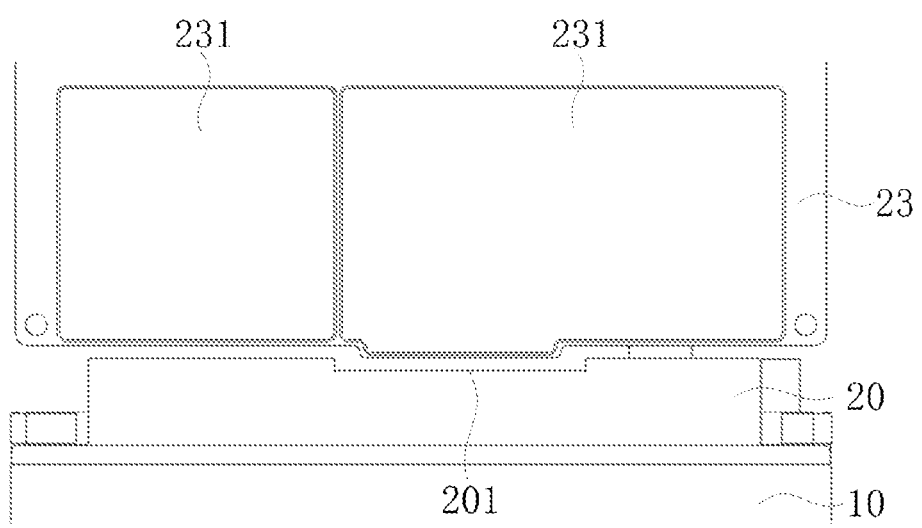
FIG. 6 is a schematic structural diagram of a battery and a circuit board according to an embodiment of this application.

In a possible implementation, the circuit board 23 may be partially located inside the notch 201. For example, referring to FIG. 6, the circuit board 23 and a shielding case 231 located on the circuit board 23 may extend into the notch 201 of the protection board 20 for proper utilization of the space in the notch 201, thereby increasing spatial utilization in the mobile phone 200.

In addition, it should be noted that the provision of the notch 201 has to guarantee wiring space for the protection board 20 and arrangement of components on the protection board 20.

In an embodiment of this application, there may be one notch 201 (referring to FIG. 3), and a size of the notch 201 in a first direction L1 may be less than or equal to one-third of a size of the protection board 20 in the first direction L1. It should be noted that the first direction L1 is a width direction of the battery 100.

Alternatively, there may be a plurality of notches 201, and a sum of sizes of the plurality of notches 201 in the first direction L1 may be less than or equal to one-third of a size of the protection board 20 in the first direction L1. In this way, arrangement of components on the protection board 20, layout of wirings on the protection board 20, and mechanical strength of the protection board 20 can be guaranteed.

For example, the size of the notch 201 in the first direction L1 may be 15 mm to 25 mm. For example, the size of the notch 201 in the first direction L1 may be 16 mm, 17 mm, 18 mm, or the like. This is not limited in the embodiments of this application and not limited to the foregoing examples. Alternatively, the sum of the sizes of the plurality of notches 201 in the first direction L1 is 15 mm to 25 mm. For example, the sum of the sizes of the plurality of notches 201 in the first direction L1 may be 16 mm, 17 mm, 18 mm, or the like. This is not limited in the embodiment of this application and not limited to the foregoing examples.

It should be noted that values and value ranges mentioned in the embodiments of this application are approximations subject to the manufacturing process. There may be errors within a specific range, which may be considered ignorable by persons skilled in the art.

In addition, in an optional implementation, the size of the protection board 20 in the first direction L1 is less than a size of the battery cell 10 in the first direction L1. In this way, after the protection board 20 and the battery cell 10 are assembled, one or two missing corners 50 are formed between an end of the battery cell 10 close to the protection board 20 and outer edges of left and right sides of the protection board 20, such that a space of one or two missing corners 50 can be further freed up, which helps internal spatial layout of the electronic device.

Figure 5:
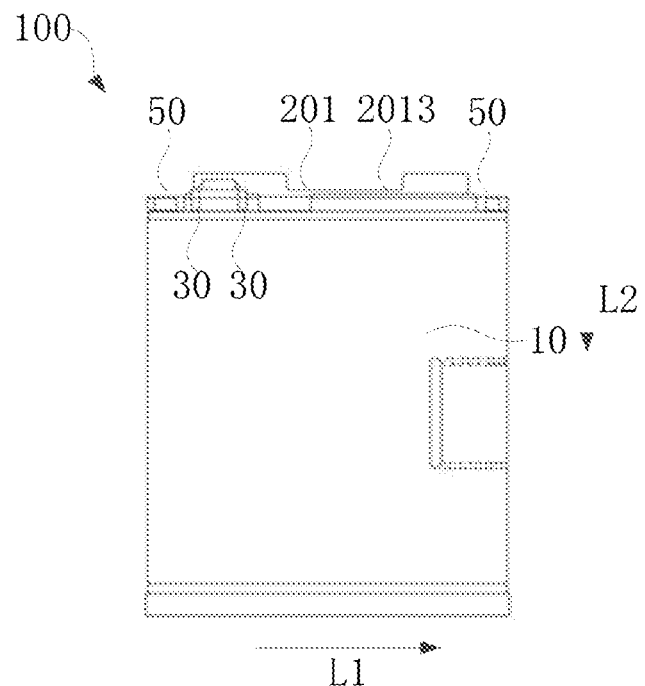
FIG. 5 is a schematic diagram of a rear-side structure of a battery according to an embodiment of this application.

For example, in FIG. 5, after the protection board 20 and the battery cell 10 are assembled, one missing corner 50 is formed between the end of the battery cell 10 close to the protection board 20 and an outer edge of a left side of the protection board 20, and one missing corner 50 is formed between the end of the battery cell 10 close to the protection board 20 and an outer edge of a right side of the protection board 20, such that a space of two missing corners 50 can be further freed up, which helps internal spatial layout of the electronic device.

It should be noted that, in some embodiments, a size of the missing corner 50 in the first direction L1 and a size of the missing corner 50 in a second direction L2 may be flexibly adjusted according to an overall size of the battery 100. Specifically, the size of the missing corner 50 in the first direction L1 is mainly related to the size of the protection board 20 in the first direction L1, and the size of the missing corner 50 in the second direction L2 is mainly related to circuit wiring changes on the protection board 20. To be specific, if circuit wirings on the protection board 20 can be arranged within a smaller space, the size of the protection board in the second direction L2 can be set smaller, and therefore the size of the missing corner 50 in the second direction L2 can also be set smaller.

Still referring to FIG. 5, the notch 201 further has a bottom wall 2013, and a distance between the bottom wall 2013 and the battery cell 10 is less than distances between the battery cell 10 and edges without notches of the protection board 20 on two sides. In an embodiment of this application, a distance between the bottom wall 2013 and the battery cell 10 is one-third to five-sixths of the size of the protection board 20 in the second direction L2. In this way, both wiring at a position corresponding to the protection board 20 under the notch 201 and layout space for other components on the protection board 20 can be guaranteed.

It should be noted that the second direction L2 is perpendicular to the first direction L1. It should be noted that the second direction L2 may be a length direction of the battery 100.

Further, still referring to FIG. 5, the battery 100 further includes at least one connecting terminal 30, where one end of the connecting terminal 30 is electrically connected to the battery cell 10, and the other end of the connecting terminal 30 is electrically connected to the protection board 20. In this way, it can be ensured that the battery cell 10 is electrically connected to the protection board 20 via the connecting terminal 30.

There may be one, two, three, or more connecting terminals 30. This is not limited in the embodiments of this application. As shown in FIG. 5, there are two connecting terminals 30 in the battery 100, in which case the battery cell 10 can be electrically connected to the protection board 20 via the two connecting terminals 30. In addition, the connecting terminal 30 may be disposed at any position on the protection board 20 based on a requirement of an actual application scenario.

It can be understood that, in the embodiments of this application, the connecting terminal 30 may specifically be disposed in positions including but not limited to those in the following two possible implementations.

In one possible implementation, as shown in FIG. 5, a projection zone of the connecting terminal 30 in the second direction L2 and a projection zone of the notch 201 in the second direction L2 are staggered, meaning that the connecting terminal 30 and the notch 201 do not have an overlapping area. In this case, the provision of the connecting terminal 30 does not affect the distance between the bottom wall 2013 and the battery cell 10. A depth of the notch 201 in the second direction L2 only needs to guarantee wiring of the protection board 20 and layout space for other components. In other words, the provision of the notch 201 does not adversely affect performance of an electrical connection between the connecting terminal 30 and the protection board 20.

In an optional implementation, the distance between the bottom wall 2013 and the battery cell 10 is one-third to two-thirds of the size of the protection board 20 in the second direction L2. For example, if a width of the protection board 20 in the second direction L2 is 6 mm, the depth of the notch 201 in the second direction L2 may be 2 mm to 4 mm, in which case the distance between the bottom wall 2013 and the battery cell 10 may be 2 mm to 4 mm.

Figure 7:
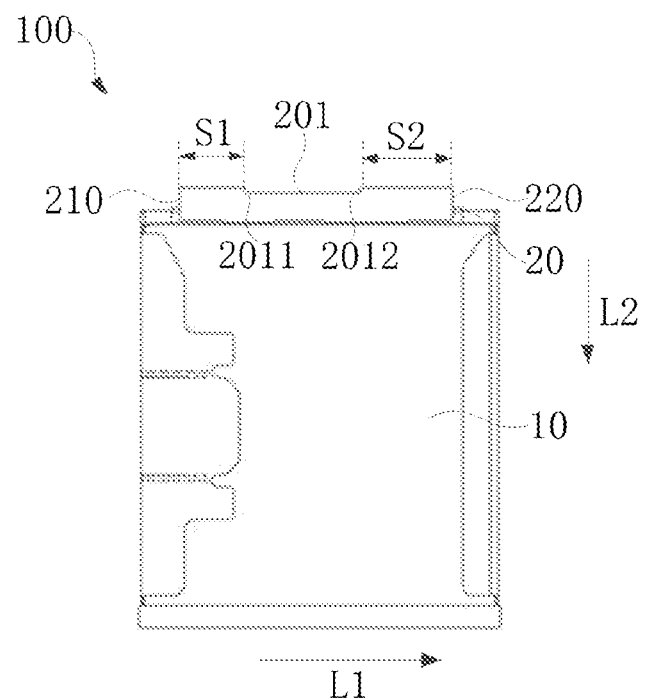
FIG. 7 is a schematic diagram of a frontal structure of a battery according to an embodiment of this application.
Figure 8:
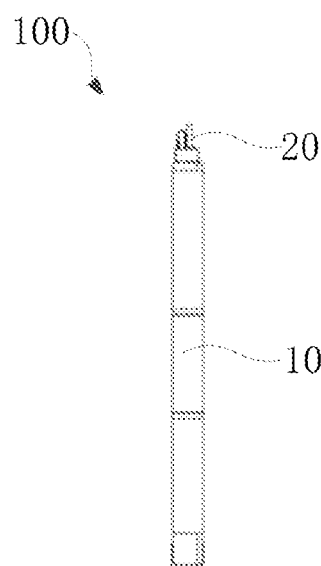
FIG. 8 is a schematic diagram of a lateral structure of a battery according to an embodiment of this application.
Figure 9:
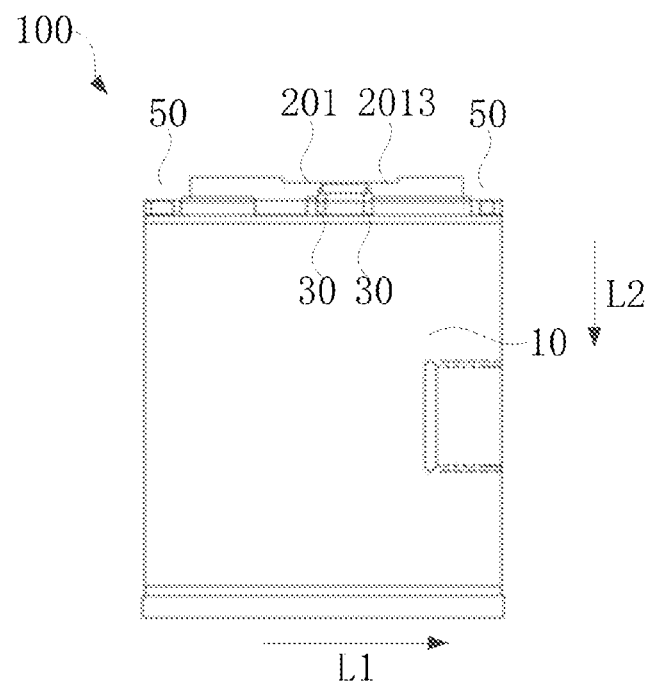
FIG. 9 is a schematic diagram of a rear-side structure of a battery according to an embodiment of this application.

In another possible implementation, as shown in FIG. 7 to FIG. 9, in an embodiment of this application, a projection zone of the connecting terminal 30 in the second direction L2 and a projection zone of the notch 201 in the second direction L2 have an overlapping zone, meaning that a position of the notch 201 overlaps a position of the connecting terminal 30. In this case, it needs to be ensured that the depth of the notch 201 in the second direction L2 does not affect the connection between the connecting terminal 30 and the protection board 20. Referring to FIG. 9, the distance between the bottom wall 2013 and the battery cell 10 may be greater than or equal to a size of the connecting terminal 30 in the second direction L2. In this way, wiring at a position corresponding to the protection board 20 under the notch 201, layout space for other components on the protection board 20, and performance of electrical connection between the connecting terminal 30 and the protection board 20 can be guaranteed.

In an optional implementation, the distance between the bottom wall 2013 and the battery cell 10 may be two-thirds to five-sixths of the size of the protection board 20 in the second direction L2. For example, if a width of the protection board 20 in the second direction L2 is 6 mm, the depth of the notch 201 in the second direction L2 may typically be about 1 mm to 2 mm, in which case the distance between the bottom wall 2013 and the battery cell 10 may be 4 mm to 5 mm. In this way, wiring at a position corresponding to the protection board 20 under the notch 201, layout space for other components on the protection board 20, and performance of electrical connection between the connecting terminal 30 and the protection board 20 can be guaranteed.

Figure 10:
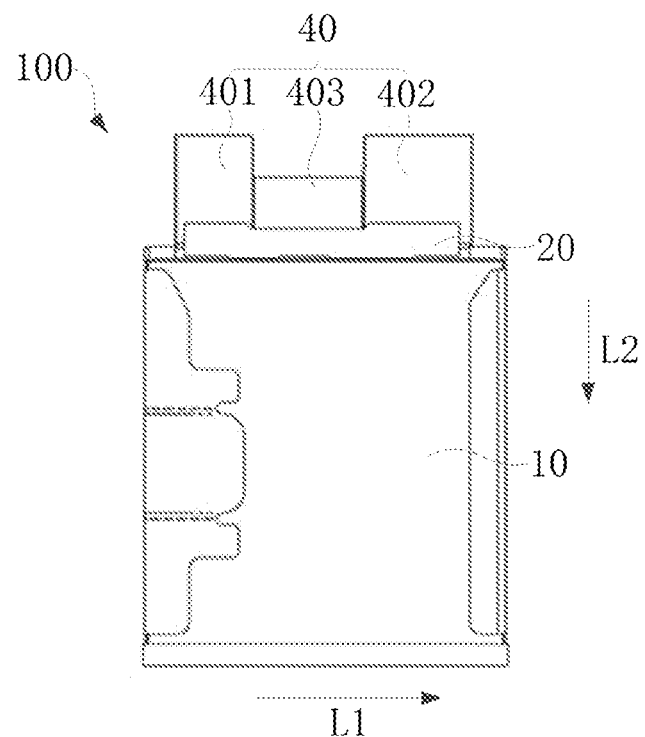
FIG. 10 is a schematic structural diagram of a packaging component of a battery in an expanded state according to an embodiment of this application.
Figure 11:
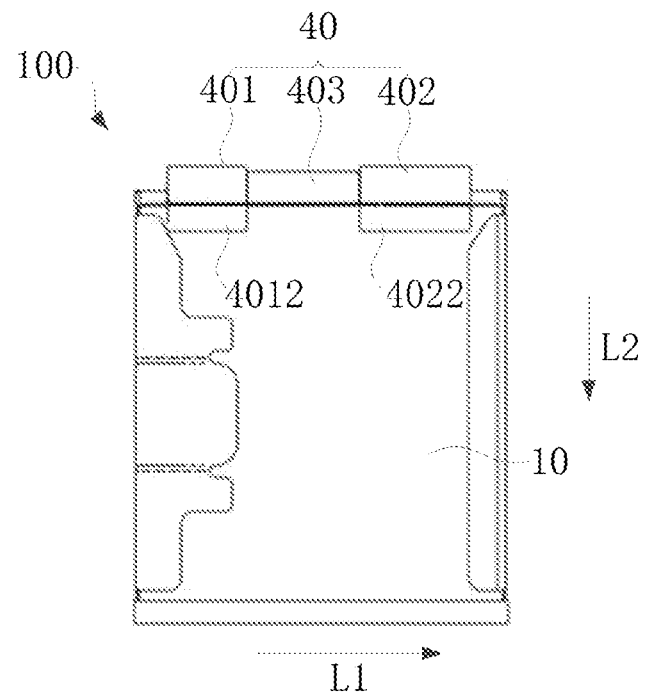
FIG. 11 is a schematic structural diagram of a packaging component of a battery in a folded state according to an embodiment of this application.

On the basis of the foregoing embodiments, as shown in FIG. 10 and FIG. 11, the battery 100 further includes a packaging component 40, where the packaging component 40 is at least partially connected to the protection board 20. The packaging component 40 may be a non-conductive insulating material, and the packaging component 40 is configured to protect the protection board 20.

Figure 12:
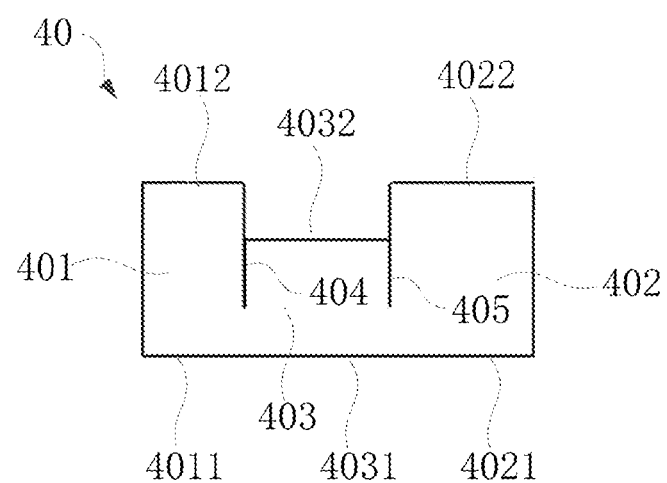
FIG. 12 is a schematic structural diagram of a packaging component of a battery according to an embodiment of this application.
Figure 13:
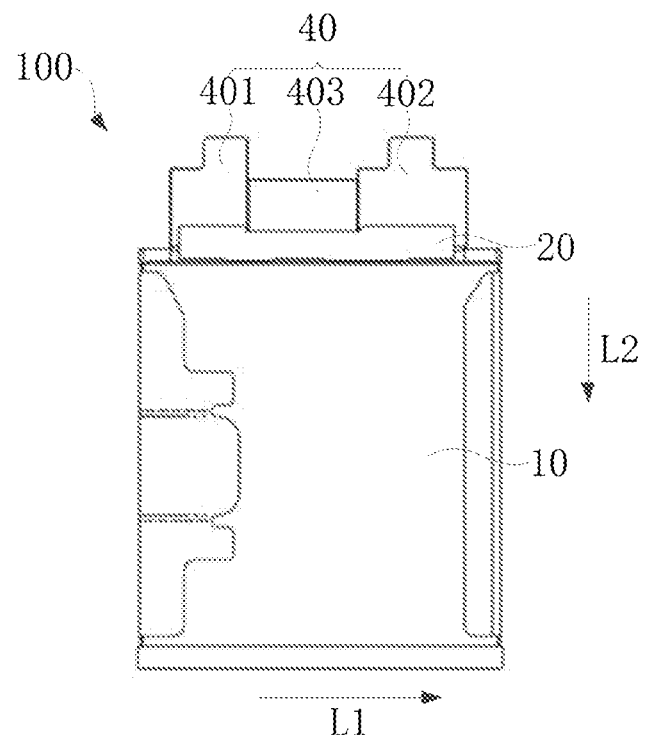
FIG. 13 is a schematic structural diagram of a packaging component of a battery in an expanded state according to an embodiment of this application.

Specifically, referring to FIG. 12, the packaging component 40 may include: a first part 401, a second part 402, and a third part 403 that is connected to the first part 401 and the second part 402. In a case that the packaging component 40 expands, a first end of the first part 4011 is flush with a first end of the second part 4021 and a first end of the third part 4031, and a second end of the third part 4032 is lower than a second end of the first part 4012 and a second end of the second part 4022. In this way, it can be ensured that the first part 401, the second part 402, and the third part 403 of the packaging component 40 form a concave that matches the notch 201 of the protection board 20.

In addition, a first slit 404 is present between the first part 401 and the third part 403, and a second slit 405 is present between the second part 402 and the third part 403. The presence of slits between the first part 401 and the third part 403 and between the second part 402 and the third part 403 helps the packaging component 40 to fit with the notch 201 of the protection board 20.

In an embodiment of this application, the third part 403 may be located in a position on the protection board 20 corresponding to the notch 201, and the first part 401 and the second part 402 are respectively located on two sides of the third part 403; and the first slit 404 overlaps the first side wall 2011 of the notch 201, and the second slit 405 overlaps the second side wall 2012 of the notch 201. That is, in an expanded state, the packaging component 40 used to wrap the protection board 20 has the first slit 404 in a left edge position of the notch 201 corresponding to the protection board 20, and has the second slit 405 in a right edge position of the notch 201 corresponding to the protection board 20.

In addition, as shown in FIG. 11, the second end of the first part 4012 and the second end of the second part 4022 are attached to an end of the battery cell 10 close to the protection board 20. In this way, connection strength between the protection board 20 and the battery cell 10 can be further guaranteed.

With the foregoing arrangements, it can be ensured that after the packaging component 40 wraps the protection board 20, a distance between the battery cell 10 and an outer side of the packaging component 40 at the notch 201 of the protection board 20 is less than distances between the battery cell 10 and outer sides of the packaging component 40 at positions without notches on two sides of the protection board 20, so that the wrapped protection board 20 still takes a profile with a recess in the middle and protrusions on two sides as shown in FIG. 11, to match a shape of the notch 201.

In addition, in a possible implementation, referring to FIG. 13 to FIG. 16, the second end of the first part 4012 may have a protruding portion 406; or the second end of the second part 4022 has a protruding portion 406; or the second end of the first part and the second end of the second part 4022 both have a protruding portion 406.

Figure 14:
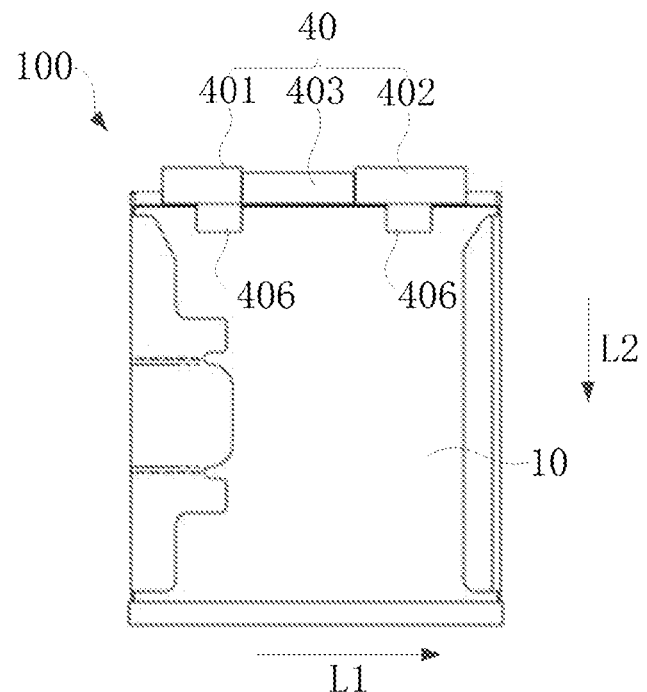
FIG. 14 is a schematic structural diagram of a packaging component of a battery in a folded state according to an embodiment of this application.
Figure 15:
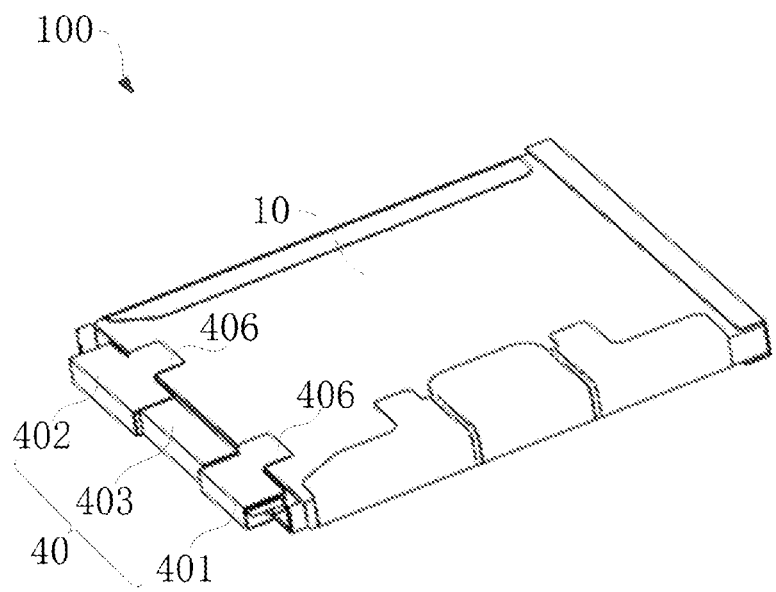
FIG. 15 is a schematic structural diagram of a packaging component of a battery in a folded state according to an embodiment of this application.
Figure 16:
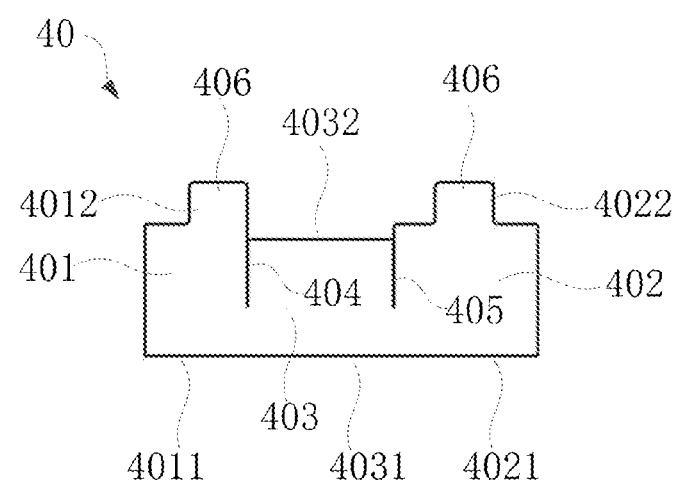
FIG. 16 is a schematic structural diagram of a packaging component of a battery according to an embodiment of this application.

As shown in FIG. 16, the second end of the second part 4012 and the second end of the second part 4022 both have a protruding portion 406, and the protruding portion 406 is attached to an end of the battery cell 10 close to the protection board 20 (referring to FIG. 14 and FIG. 15). In this way, a bonding area for the first part 401 and the second part 402 on the battery cell 10 can be saved, reducing a size of the packaging component 40 and lowering costs.

It should be noted that the protruding portion 406 may have any shape. For example, the protruding portion 406 may be a rectangle as shown in FIG. 16, or a circle, an oval, a triangle, or the like. This is not limited in the embodiments of this application and not limited to the forgoing examples. In addition, the embodiments of this application do not limit a size of the protruding portion 406, as long as connection strength between the protection board 20 and the battery cell 10 is guaranteed.

In some embodiments, the packaging component 40 may be made of MYLAR. MYLAR is a material made from dimethyl terephthalate and ethylene glycol heated with the help of related catalysts and subjected to transesterification, polycondensation under vacuum, and biaxial stretching. MYLAR is dimensionally stable and straight dimension with excellent tensile strength. It is resistant to heat, cold, moist, water, and chemical corrosion, and has excellent insulation performance as well as excellent electrical performance, mechanical performance, heat resistance and chemical resistance.

Alternatively, in some other embodiments, the packaging component 40 may be an aluminum-plastic film. Aluminum-plastic film consists of a nylon layer, an aluminum layer and a polypropylene layer. It has extremely high barrier and good cold stamping formability with resistance to puncture and electrolyte, and provides good electrical and insulation performance as well as about 80 times moisture resistance of ordinary polyethylene materials. It can be understood that the packaging component 40 may alternatively be a plastic film made of other materials. This is not limited in the embodiments of this application.

It should be noted that the outside the battery cell 10 is usually wrapped in an aluminum-plastic film. In an embodiment of this application, in a case that the packaging component 40 is an aluminum-plastic film, the packaging component 40 and the aluminum-plastic film that wraps the outside of the battery cell 10 may be one piece.

It is easily understood that the protection board 20 is a line board that provides overcharge protection and short-circuit protection. Specifically, the protection board 20 may be electrically connected to the circuit board of the mobile phone 200 via a battery interface (not shown in the figure).

The protection board 20 can protect the battery 100 against factors such as overcharge, over-discharge and short-circuit that may severely damage performance of the battery 100, thereby eliminating risks of use. In a case that current or voltage in the battery cell 10 is excessively high or excessively low, the protection board 20 can be disconnected from the battery interface. Therefore, by connecting protection board 20 to the battery interface and the battery cell 10, risks in safe use of the battery 100 due to problems such as over-voltage, overcharge, over-current, and over-discharge of the battery 100 can be avoided.

In some embodiments, the protection board 20 may be provided with any one or more components of a positive temperature coefficient thermistor, a circuit breaker, and a metal-oxide semiconductor field-effect transistor.

By temperature coefficient, thermistors can be classified into positive temperature coefficient (PTC) thermistors and negative temperature coefficient (NTC) thermistors. Thermistors are sensitive to temperature, having different resistance under different temperatures. Positive temperature coefficient thermistors have higher resistance under a higher temperature while negative temperature coefficient (NTC) thermistors have lower resistance under a higher temperature.

It should be noted that positive temperature coefficient thermistors, also known as resettable fuses, are extremely suitable to serve as over-current protectors because of their unique positive temperature coefficient resistance.

With a circuit functioning properly, the positive temperature coefficient thermistor has a temperature close to room temperature and low resistance, and does not impede the flow of current when connected to the circuit in series. Under over-current due to malfunction of the circuit, the positive temperature coefficient thermistor has a raised temperature because of increased thermal power, and when its temperature exceeds a switch temperature, its resistance surges instantaneously so that current in the circuit rapidly decreases to a safe value. After the positive temperature coefficient thermistor acts, current in the circuit is significantly decreased.

In addition, because positive temperature coefficient thermistors are highly designable, the switch temperature of the positive temperature coefficient thermistor can be changed to adjust its sensitivity to temperature so as to provide both overheat protection and over-current protection.

A circuit breaker is a switch device that is able to close, carry, and break a current flow under a normal loop condition and able to close and within a specified time carry and break a current flow under an abnormal loop condition. By scope of usage, circuit breakers are classified into high voltage circuit breakers and low voltage circuit breakers, where high voltage circuit breakers generally operate at a voltage above 3 kV. The circuit breaker functions to break and close a load circuit and break a faulty circuit to prevent further incidents and ensure safe operation.

A metal-oxide semiconductor field-effect transistor (MOSFET), referred to as metal-oxide semiconductor field-effect transistor for short, is a field-effect transistor that can be widely used in analog circuits and digital circuits. With the presence of a sufficiently large potential difference across a gate electrode and a source electrode of the metal-oxide semiconductor field-effect transistor, an electric field produces induced charges on a semiconductor surface below an oxide layer, in which case an "inversion channel" is created. The inversion channel has the same polarity as a drain electrode and the source electrode of the metal-oxide semiconductor field-effect transistor. If the drain electrode and the source electrode are n type, the inversion channel is n type. After the inversion channel is formed, the metal-oxide semiconductor field-effect transistor allows the current to flow through. In accordance with changing of the voltage applied to the gate electrode, intensity of the current allowed to flow through the channel of the metal-oxide semiconductor field-effect transistor also changes due to control of the transistor.

Because the battery 100 is provided with the protection board 20 and the protection board 20 is provided with any one or more components of a positive temperature coefficient thermistor, a circuit breaker, and a metal-oxide semiconductor field-effect transistor, over-current protection, over-voltage protection, overcharge protection, over-discharge protection and the like for the battery 100 can be further implemented. Once a failure occurs, the protection board 20 initiates a protection action by breaking its physical connection with the battery cell 10 so as to protect the battery 100.

In addition, it should be noted that the embodiment of this application can be applied to batteries 100 of different sizes and protection boards 20 of different sizes, and the size of the recess (the notch 201) in the profile of the battery can be flexibly adjusted according to an overall size of the battery 100 and the protection board 20, to adapt to requirements of different actual application scenarios.

In the descriptions of the embodiments of this application, it should be noted that unless otherwise specified and defined explicitly, the terms "mount", "communicate", and "connect" should be understood in their general senses. For example, they may refer to a fixed connection, an indirect connection via an intermediate medium, internal communication between two components, or interaction between two components. Persons of ordinary skill in the art can understand specific meanings of these terms in this application based on specific situations.

Apparatuses or elements, as described or implied in the embodiments of this application, have a particular orientation or are constructed and operate in a particular orientation, but this should not be construed as any limitation on the embodiments of this application. In the descriptions of this application, "a plurality of" means two or more, unless otherwise accurately and specifically defined.

In the specification, claims, and accompanying drawings of the embodiments of this application, terms "first", "second", "third", "fourth", and so on (if existent) are intended to distinguish between similar objects but do not necessarily indicate a specific order or sequence. It should be understood that the terms so used are interchangeable in appropriate circumstances, so that the embodiments of this application described herein can be implemented in other orders than the order illustrated or described herein. In addition, the terms "may include", "have", and any other variants thereof are intended to cover a non-exclusive inclusion. For example, a process, method, system, product, or device that includes a list of steps or units is not necessarily limited to those steps or units that are expressly listed, but may include other steps or units that are not expressly listed or are inherent to such process, method, product, or device.

In conclusion, it should be noted that the foregoing embodiments are merely intended for describing the technical solutions of the embodiments of this application but not for limiting this application. Although this application has been described in detail with reference to the foregoing embodiments, persons of ordinary skill in the art should understand that they may still make modifications to the technical solutions described in these embodiments or make equivalent replacements to some or all technical features thereof, without departing from the scope of the technical solutions of the embodiments of this application.

What is claimed is:

1. A battery, comprising:
   a battery cell; and
   a protection board connected to the battery cell;
   wherein at least one notch is provided at an end of the protection board away from the battery cell;
   wherein the at least one notch has a first side wall and a second side wall opposite the first side wall, wherein a first preset distance is present between the first side wall and an outer edge of one side of the protection board, and wherein a second preset distance is present between the second side wall and an outer edge of the other side of the protection board;
   wherein the first preset distance and the second preset distance are both greater than 0;
   wherein the at least one notch is one notch, and a size of the one notch in a first direction is less than or equal to one-third of a size of the protection board in the first direction, wherein the first direction is a width direction of the battery; and
   wherein the one notch includes a bottom wall, and a distance between the bottom wall and the battery cell is one-third to five-sixths of a size of the protection board in a second direction, wherein the second direction is perpendicular to the first direction.

2. The battery according to claim 1, wherein the size of the one notch in the first direction is 15 mm to 25 mm.

3. The battery according to claim 1, wherein the size of the protection board in the first direction is less than a size of the battery cell in the first direction.

4. The battery according to claim 1, further comprising:
   at least one connecting terminal, wherein one end of the connecting terminal is electrically connected to the battery cell, and the other end of the connecting terminal is electrically connected to the protection board.

5. The battery according to claim 4, wherein a projection zone of the connecting terminal in the second direction and a projection zone of the one notch in the second direction have an overlapping zone, wherein a distance between the bottom wall and the battery cell is greater than or equal to a size of the connecting terminal in the second direction.

6. The battery according to claim 5, wherein the distance between the bottom wall and the battery cell is two-thirds to five-sixths of the size of the protection board in the second direction.

7. The battery according to claim 1, further comprising:
   a packaging component, wherein the packaging component is at least partially connected to the protection board, and wherein the packaging component is configured to protect the protection board.

8. A battery, comprising:
   a battery cell;
   a protection board connected to the battery cell; and
   a packaging component;
   wherein at least one notch is provided at an end of the protection board away from the battery cell;
   wherein the at least one notch has a first side wall and a second side wall opposite the first side wall, wherein a first preset distance is present between the first side wall and an outer edge of one side of the protection board, and wherein a second preset distance is present between the second side wall and an outer edge of the other side of the protection board;
   wherein the first preset distance and the second preset distance are both greater than 0;
   wherein the packaging component is at least partially connected to the protection board, and wherein the packaging component is configured to protect the protection board;
   wherein the packaging component comprises a first part, a second part, and a third part, wherein the third part is connected to the first part and the second part;
   wherein a first end of the first part is flush with a first end of the second part and a first end of the third part, and wherein a second end of the third part is lower than a second end of the first part and a second end of the second part; and
   wherein a first slit is present between the first part and the third part, and a second slit is present between the second part and the third part.

9. The battery according to claim 8,
   wherein the third part is located in a position on the protection board corresponding to the at least one notch, and the first part and the second part are respectively located on two sides of the third part; and
   wherein the first slit overlaps the first side wall of the at least one notch, and the second slit overlaps the second side wall of the at least one notch.

10. The battery according to claim 8, wherein the second end of the first part and the second end of the second part are attached to an end of the battery cell.

11. The battery according to claim 8, wherein the second end of the first part has a protruding portion.

12. The battery according to claim 11, wherein the protruding portion is attached to an end of the battery cell.

13. The battery according to claim 8, wherein the packaging component is made of MYLAR or an aluminum-plastic film.

14. The battery according to claim 1, wherein the protection board includes one or more of a positive temperature coefficient thermistor, a circuit breaker, or a metal-oxide semiconductor field-effect transistor.

15. An electronic device, comprising:
    at least a display screen;
    a rear cover;
    a circuit board located between the display screen and the rear cover; and
    a battery, wherein the battery comprises:
      a battery interface;
      a battery cell; and
      a protection board connected to the battery cell;
    wherein at least one notch is provided at an end of the protection board away from the battery cell;
    wherein the at least one notch has a first side wall and a second side wall opposite the first side wall, wherein a first preset distance is present between the first side wall and an outer edge of one side of the protection board, and wherein a second preset distance is present between the second side wall and an outer edge of the other side of the protection board;
    wherein the first preset distance and the second preset distance are both greater than 0;
    wherein the at least one notch is one notch, and a size of the one notch in a first direction is less than or equal to one-third of a size of the protection board in the first direction, wherein the first direction is a width direction of the battery;
    wherein the one notch includes a bottom wall, and a distance between the bottom wall and the battery cell is one-third to five-sixths of a size of the protection board in a second direction, wherein the second direction is perpendicular to the first direction; and wherein the battery interface of the battery is electrically connected to the circuit board.

16. The electronic device according to claim 15, wherein the circuit board is partially located inside the at least one notch.

* * * * *